United States Patent
Shih et al.

(10) Patent No.: US 7,142,499 B2
(45) Date of Patent: Nov. 28, 2006

(54) METHOD AND APPARATUS FOR AUTOMATICALLY TUNING PRE-PIT SLICING LEVEL

(75) Inventors: Bor-Cheng Shih, Kao-Hsiung Hsien (TW); Shun-Yung Wang, Hsin-Chu Hsien (TW); Hsu-Feng Ho, Taipei (TW)

(73) Assignee: MediaTek Incorporation, Hsin-Chu Hsien (TW)

( * ) Notice: Subject to any disclaimer, the term of this patent is extended or adjusted under 35 U.S.C. 154(b) by 148 days.

(21) Appl. No.: 10/905,965

(22) Filed: Jan. 28, 2005

(65) Prior Publication Data

US 2005/0174913 A1    Aug. 11, 2005

(30) Foreign Application Priority Data

Feb. 5, 2004   (TW) ............................... 93102695 A

(51) Int. Cl.
  *G11B 7/00*   (2006.01)
  *G11B 5/09*   (2006.01)

(52) U.S. Cl. ........................... 369/124.12; 369/124.15; 369/59.17

(58) Field of Classification Search ............. 369/59.17, 369/59.15, 59.27, 59.24, 59.22, 59.21, 124.12, 369/124.15, 124.07, 124.01, 124.14, 44.41, 369/47.1, 53.21, 47.25
See application file for complete search history.

(56) References Cited

U.S. PATENT DOCUMENTS

| | | | | |
|---|---|---|---|---|
| 6,744,721 | B1 * | 6/2004 | Kamioka et al. | 369/124.12 |
| 7,079,475 | B1 * | 7/2006 | Hagiwara | 369/124.12 |

* cited by examiner

*Primary Examiner*—Ali Neyzari
(74) *Attorney, Agent, or Firm*—Winston Hsu

(57) ABSTRACT

The present invention provides a method for automatically tuning a pre-pit slicing level and a related apparatus. The pre-pit slicing level can be used for slicing a first signal generated by an optical storage device when reading an optical storage disc to identify at least one pre-pit signal within the first signal. The method includes finding a first maximum according to the first signal, and generating the pre-pit slicing level according to the first maximum so that the optical storage device is capable of identifying the pre-pit signal within the first signal.

20 Claims, 7 Drawing Sheets

METHOD AND APPARATUS FOR AUTOMATICALLY TUNING PRE-PIT SLICING LEVEL

BACKGROUND

The present invention relates to a method and an apparatus for automatically tuning a pre-pit slicing level.

According to the DVD-RW specification as an example, the optical storage device generates a plurality of pre-pit signals when reading the optical storage disc. The pre-pit signals correspond to physical addresses of the optical storage disc. Levels of the pre-pit signals vary due to the variance of discs, number of access times, and system states of the optical storage device. Whether the levels can be correctly detected influences the performance of the optical storage device.

FIG. 1 illustrates a diagram of a pre-pit slicing level PPSLV according to the related art. The pre-pit slicing level PPSLV is generated utilizing a signal source of a fixed level. That is, the pre-pit slicing level PPSLV is fixed. Please note that the levels of pre-pit signals 110p, 120p, and 130p are not identical. In addition, amplitudes of different waveforms 110, 120, and 130 where the pre-pit signals 110p, 120p, and 130p are respectively located are usually different. Furthermore, some of the waveforms 110, 120, and 130 vary with different offsets. As a result, using the pre-pit slicing level PPSLV having a fixed level to slice the pre-pit signals 110p, 120p, and 130p would lead to erroneous identification of the physical addresses to which the pre-pit signals 110p, 120p, and 130p correspond. An ideal case shown in FIG. 1 involves the pre-pit slicing level PPSLV crossing the pre-pit signal 110p so that the physical address to which the pre-pit signal 110p corresponds can be correctly identified. An erroneous case shown in FIG. 1 can be seen when the pre-pit slicing level PPSLV does not cross the pre-pit signal 120p so that the physical address to which the pre-pit signal 120p corresponds cannot be identified. Another erroneous case shown in FIG. 1 can be seen when the pre-pit slicing level PPSLV crosses the waveform 130 under the pre-pit signal 130p so that the physical address to which the pre-pit signal 130p corresponds would be inaccurately identified. In addition, the pre-pit slicing level PPSLV further crosses the waveform 130w so that the physical address to which the pre-pit signal 130p corresponds will be erroneously identified.

SUMMARY

The present invention provides a method for automatically tuning a pre-pit slicing level. The pre-pit slicing level is used for slicing a first signal generated by an optical storage device when reading an optical storage disc to identify at least one pre-pit signal within the first signal. The method includes: finding a first maximum according to the first signal; and generating the pre-pit slicing level according to the first maximum so that the optical storage device is capable of identifying the pre-pit signal within the first signal.

The present invention correspondingly provides a circuit for automatically tuning a pre-pit slicing level. The pre-pit slicing level is used for slicing a first signal generated by an optical storage device when reading an optical storage disc to identify at least one pre-pit signal within the first signal. The circuit includes: a first maximum detection unit coupled to the optical storage device for finding a first maximum according to the first signal; and a control unit coupled to the first maximum detection unit for generating the pre-pit slicing level according to the first maximum so that the optical storage device is capable of identifying the pre-pit signal within the first signal.

DETAILED DESCRIPTION

Figure 2:
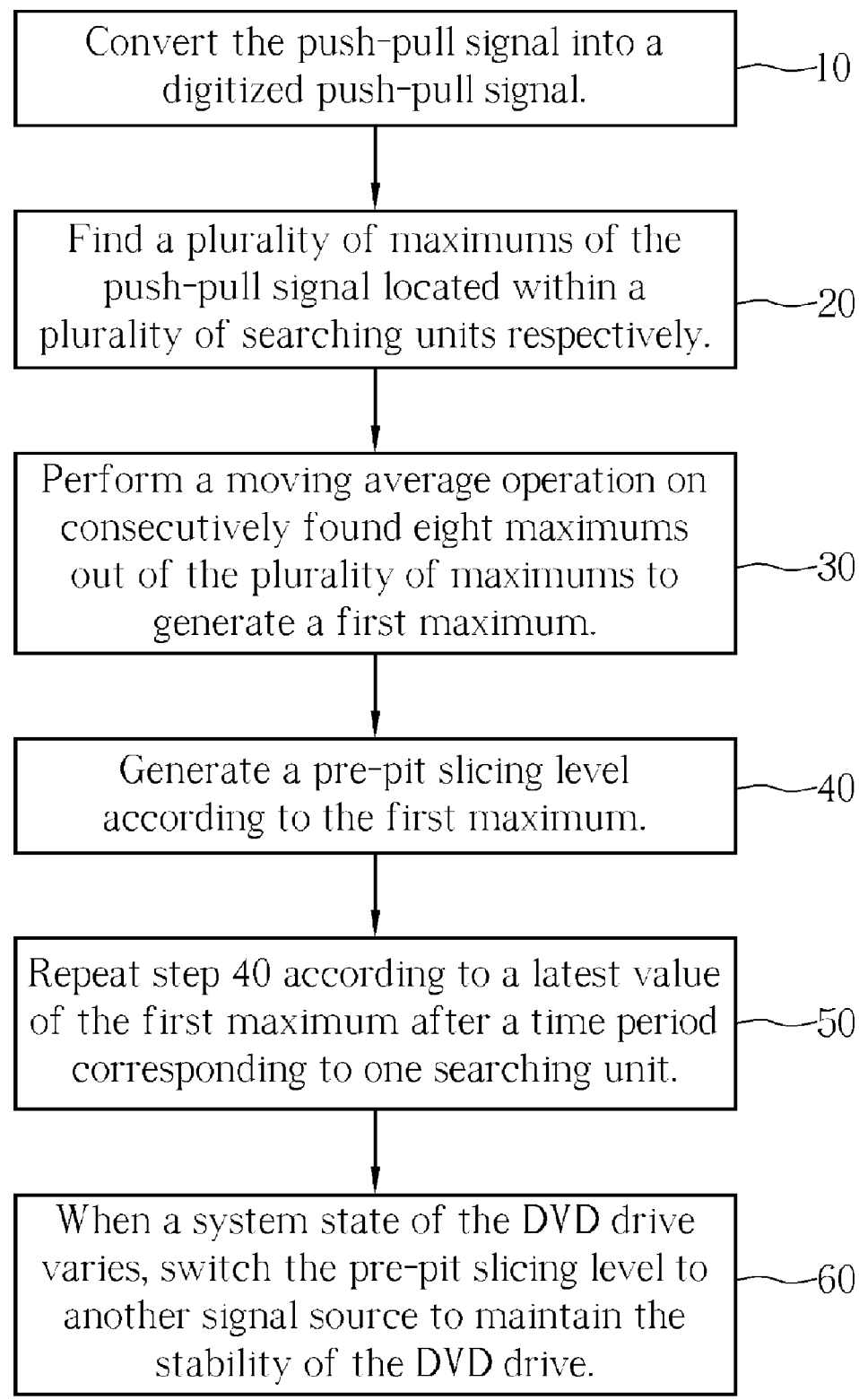
FIG. 2 is a flowchart of a method for automatically tuning a pre-pit slicing level according to the present invention.
Figure 3:
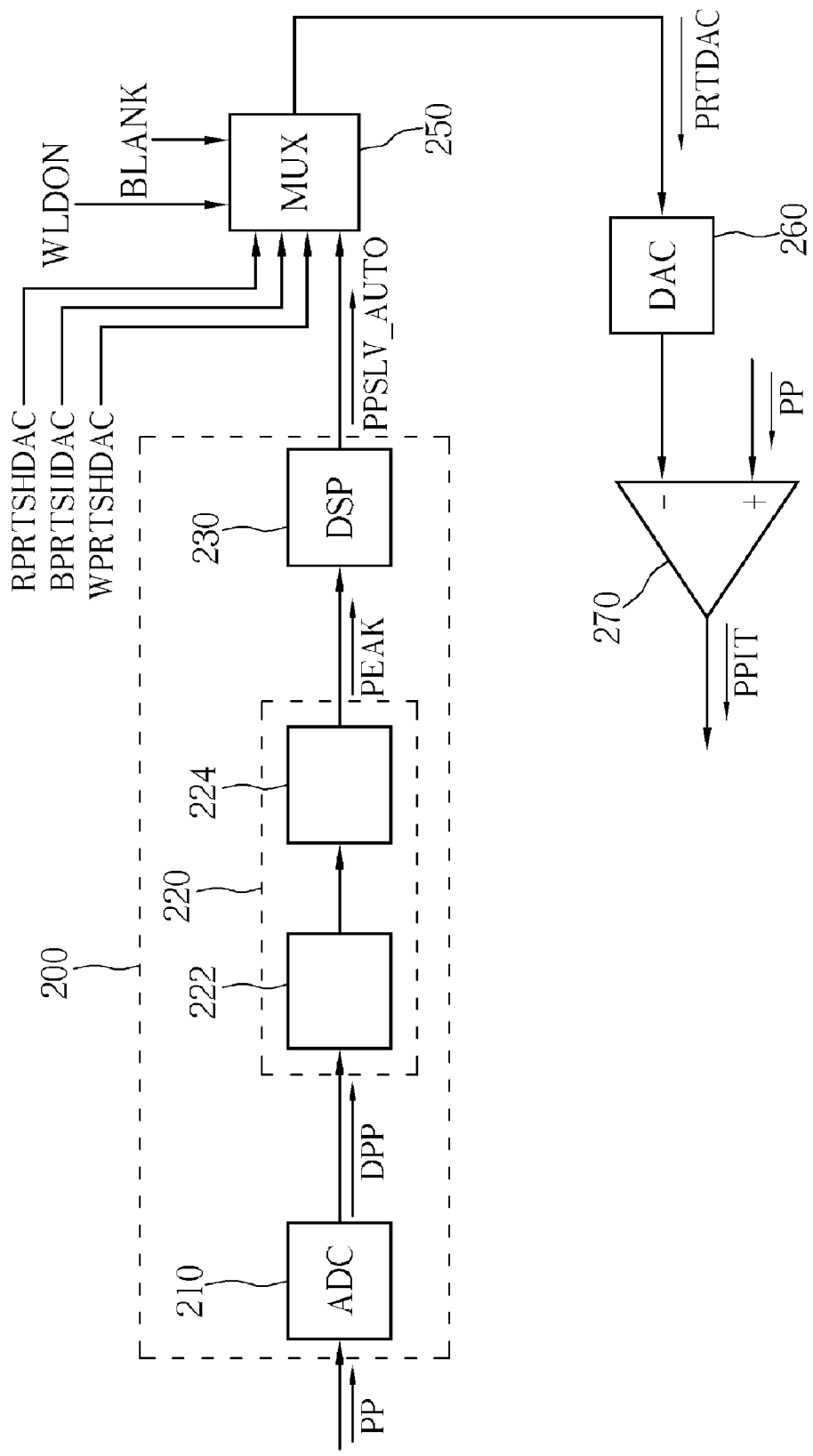
FIG. 3 is a diagram of related devices of the method shown in FIG. 2.

Please refer to FIG. 2 and FIG. 3 for a first embodiment of the present invention. FIG. 2 illustrates a flowchart of a method for automatically tuning a pre-pit slicing level according to the present invention. FIG. 3 illustrates a diagram of related devices of the method shown in FIG. 2. The present invention provides a method for automatically tuning a pre-pit slicing level. The pre-pit slicing level is used for slicing a push-pull signal PP generated by an optical storage device when reading an optical storage disc to identify at least one pre-pit signal within the push-pull signal PP. Although in the following, the optical storage device and the optical storage disc are described using a Digital Versatile Disc (DVD) drive and a DVD respectively, this is not a limitation of the present invention. The present invention method is described as follows.

Step 10: Convert the push-pull signal PP into a digitized push-pull signal DPP, which is a digital format of the push-pull signal PP, using an analog-to digital converter (ADC) 210.

Step 20: Find a plurality of maximums of the push-pull signal DPP located within a plurality of searching units respectively using a local maximum detection unit 222. Each searching unit includes sixteen frames. As a result, each of the maximums corresponds to at least one pre-pit signal.

Step 30: Perform a moving average operation on consecutively found eight maximums out of the plurality of maximums using a moving average unit 224 to generate a first maximum PEAK. The eight maximums correspond to eight continuously transmitted searching units respectively out of the plurality of searching units.

Step 40: Generate a pre-pit slicing level PPSLV_AUTO according to the first maximum PEAK using a digital signal processor (DSP) 230, wherein the pre-pit slicing level PPSLV_AUTO can be generated by multiplying the first maximum PEAK with a predetermined decay factor 90% or subtracting a predetermined decay value 0.1 mV from the first maximum PEAK.

Step 50: Repeat step 40 using the digital signal processor 230 according to a latest value of the first maximum PEAK after a time period corresponding to one searching unit. That is, the digital signal processor 230 repeats step 40 for each searching unit so that the pre-pit slicing level PPSLV_AUTO is revised in real time for each searching unit to prevent offset variance or amplitude variance of the push-pull signal PP from influencing accuracy of the pre-pit slicing level PPSLV_AUTO with respect to each pre-pit signal.

Step 60: When a system state of the DVD drive varies so that multiplexer control signals WLDON and BLANK vary correspondingly, switch the pre-pit slicing level to another signal source of a fixed level such as one of the pre-pit slicing levels WPRTSHDAC, BPRTSHDAC, and RPRTSH-DAC shown in FIG. 3 using a multiplexer 250 to maintain the stability of the DVD drive. The multiplexer 250 is used for multiplexing one of the pre-pit slicing levels PPSLV_AUTO, WPRTSHDAC, BPRTSHDAC, and RPRT-SHDAC according to the multiplexer control signals WLDON and BLANK.

Figure 1:
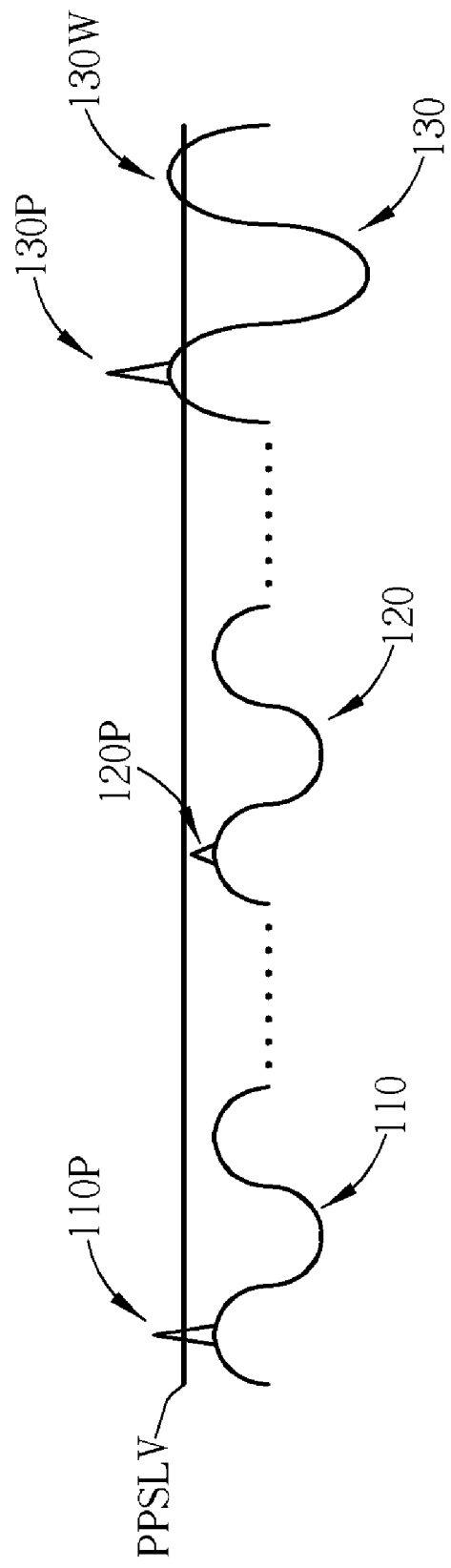
FIG. 1 is a diagram of a pre-pit slicing level according to the related art.

In the first embodiment, step 20 together with step 30 find the first maximum PEAK according to the push-pull signal PP using a first maximum detection unit 220 including the local maximum detection unit 222 and the moving average unit 224. The predetermined decay factor 90% and the predetermined decay value 0.1 mV used in step 40 can be defined in advance according to the characteristic of the push-pull signal PP or can be derived from trial experiments of possible values. As the pre-pit slicing level PPSLV_AUTO generated in step 40 is slightly less than the first maximum PEAK, the pre-pit slicing level PPSLV_AUTO revised in real time will cross each pre-pit signal. Therefore, according to the present invention, the pre-pit slicing level PPSLV_AUTO crossing each pre-pit signal behaves like the ideal case shown in FIG. 1 being that the pre-pit slicing level PPSLV crosses the pre-pit signal 110$p$. In addition, according to the present invention, there exists neither a case like the erroneous case shown in FIG. 1 being that the pre-pit slicing level PPSLV does not cross the pre-pit signal 120$p$, nor a case like the erroneous case shown in FIG. 1 being that the pre-pit slicing level PPSLV crosses the waveform 130 under the pre-pit signal 130$p$. Consequently, after the multiplexer 250 multiplexes the pre-pit slicing level PPSLV_AUTO to generate the pre-pit slicing level PRTDAC, a digital-to-analog converter (DAC) 260 converts the pre-pit slicing level PRTDAC into an analog pre-pit slicing level, which is an analog format of the pre-pit slicing level PRTDAC, and outputs the analog pre-pit slicing level into the comparator 270. As a result, the comparator 270 is capable of identifying each pre-pit signal within the push-pull signal PP and correspondingly outputs a comparison result PPIT representing the pre-pit signals.

Figure 4:
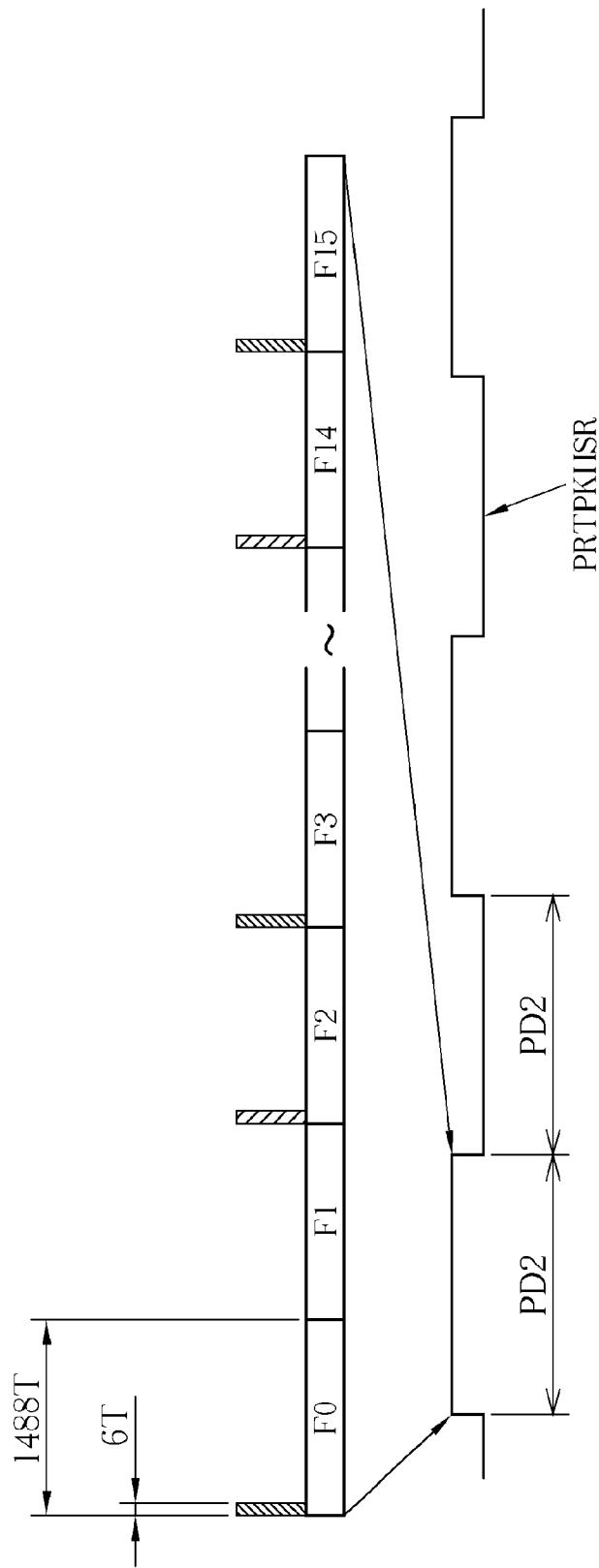
FIG. 4 is a diagram of related signals of the method shown in FIG. 2.

Please refer to FIGS. 2–4. FIG. 4 is a diagram of related signals of the method shown in FIG. 2. As one pre-pit signal appears every two frames, and as the next pre-pit signal appears after a time period of three frames when switching of even/odd frames occurs, time intervals for detecting the maximum of the push-pull signal PP should be within three frames to ensure that the pre-pit slicing level PPSLV_AUTO generated by step 40 according to the maximum PEAK detected by steps 20 and 30 has a latest value. In the present embodiment, the push-pull signal PP corresponding to an inverting period PD2 of the control signal PRTPKHSR shown in FIG. 4 includes sixteen frames F0, F1, . . . , and F15 to ensure that the pre-pit signal pulses of a width of 6 T shown in FIG. 4 can be detected within each time interval to generate the pre-pit slicing level correctly.

Figure 5:
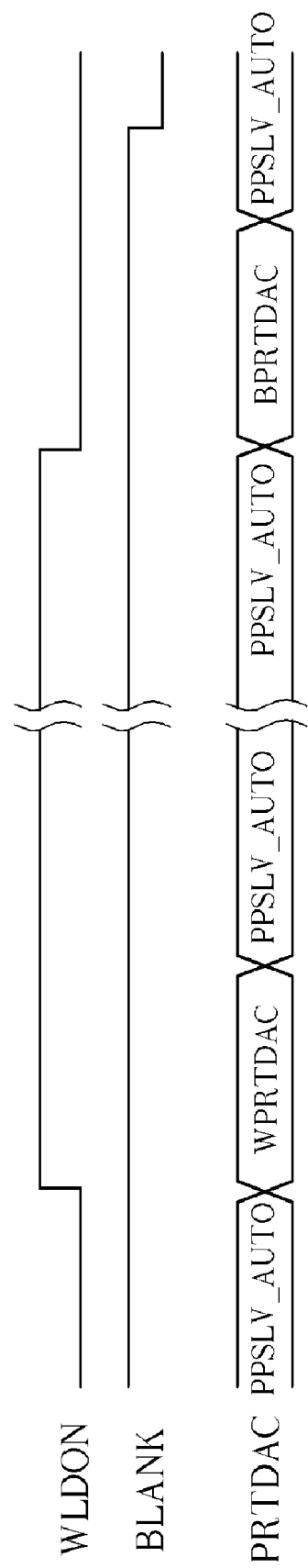
FIG. 5 is a diagram illustrating a time sequence of signal source switching for the pre-pit slicing level according to the present invention.
Figure 6:
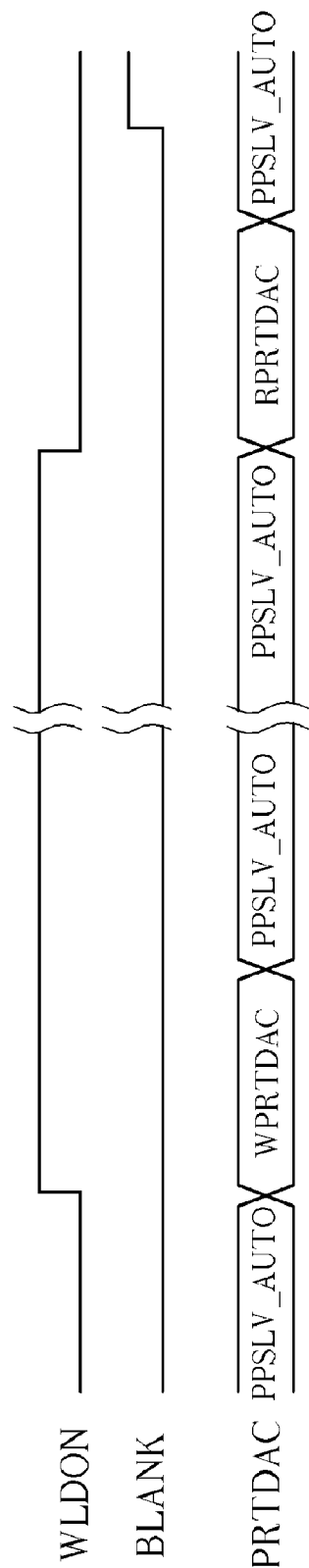
FIG. 6 is a diagram illustrating a time sequence of signal source switching for the pre-pit slicing level according to the present invention.
Figure 7:
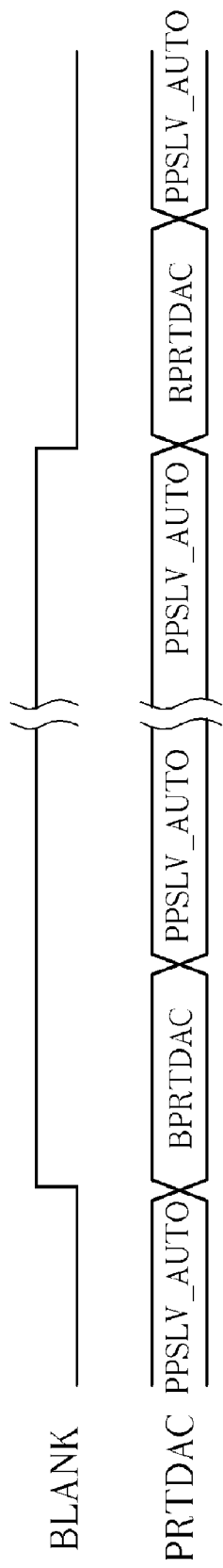
FIG 7 is a diagram illustrating a time sequence of signal source switching for the pre-pit slicing level according to the present invention.

Please refer to FIGS. 2–3 and FIGS. 5–7. Each of FIGS. 5–7 is a diagram illustrating a time sequence of signal source switching for the pre-pit slicing level according to the present invention. As shown in FIGS. 5–7, the multiplexer output signal PRTDAC, which is the above-mentioned pre-pit slicing level PRTDAC shown in FIG. 3, includes four output states PPSLV_AUTO, WPRTDAC, BPRTDAC, and RPRTDAC corresponding to the four input signals PPSLV_AUTO, WPRTSHDAC, BPRTSHDAC, and RPRT-SHDAC of the multiplexer 250, respectively. Variations of the system state mentioned in step 60 include: a read area of the DVD by the DVD drive being changed from a data area to a blank area; the read area of the DVD by the DVD drive being changed from a blank area to a data area; the DVD drive starting to perform a burning operation on the DVD; and the DVD drive stopping performing the burning operation on the DVD. As shown in FIGS. 5–7, when the system state of the DVD drive varies so that the control signals WLDON and BLANK of the multiplexer 250 vary correspondingly, the multiplexer output signal PRTDAC outputted from the multiplexer 250 varies correspondingly so that switching the pre-pit slicing level to another signal source, as mentioned in step 60, is accomplished. Therefore, step 60 prevents the stability of the DVD drive from being influenced by the aforementioned variations of the system state. That is, within a protection time period after the system state varies and along the time axis, the present invention method and device is capable of switching the pre-pit slicing level to another signal source of a stable and fixed level so that when the push-pull signal PP varies greatly due to the variations of the system state, the DVD drive still operates continuously according to the pre-pit slicing level.

Please refer to FIG. 3 again. According to the first embodiment, the present invention correspondingly provides a circuit for automatically tuning a pre-pit slicing level. The pre-pit slicing level is used for slicing a push-pull signal PP generated by a DVD drive when reading a DVD to identify at least one pre-pit signal within the push-pull signal PP. The circuit includes: an ADC 210 coupled to the DVD drive for converting the push-pull signal PP into a digitized push-pull signal DPP; a first maximum detection unit 220 coupled to the ADC 210 for finding a first maximum PEAK according to the push-pull signal DPP; and a DSP 230 coupled to the first maximum detection unit 220 for generating a pre-pit slicing level PPSLV_AUTO according to the first maximum PEAK. Wherein, the pre-pit slicing level PPSLV_AUTO is less than the first maximum PEAK so that the DVD drive is capable of identifying each pre-pit signal within the push-pull signal DPP. The circuit further includes a multiplexer 250 coupled to the DSP 230. When a system state of the DVD drive varies, the multiplexer 250 is capable of switching the pre-pit slicing level from the pre-pit slicing level PPSLV_AUTO generated by the automatically tuning circuit 200 to another signal source of a fixed level such as one of the pre-pit slicing levels WPRTSHDAC, BPRTSHDAC, and RPRTSHDAC shown in FIG. 3 through the control of control signals WLDON and BLANK to maintain the stability of the DVD drive. As the above-mentioned method, the first maximum detection unit 220 further includes: a local maximum detection unit 222 coupled to the DVD drive for finding a plurality of maximums of the push-pull signal DPP located within a plurality of frames of the push-pull signal DPP respectively; and a moving average unit 224 electrically connected to the local maximum detection unit 222 and the DSP 230 for performing a moving average operation on three maximums out of the plurality of maximums to generate an average maximum being the first maximum PEAK. Wherein the three maximums correspond to three continuously transmitted frames out of the plurality of frames respectively.

According to the first embodiment, the operation order of the first maximum detection unit 220 involves: firstly finding the maximum using the local maximum detection unit 222; and secondly performing the moving average using the moving average unit 224. The above-mentioned order of the operations is a choice of implementation and is not a limitation of the present invention. In a second embodiment of the present invention, the operation order of the first maximum detection unit 220 is: firstly performing a moving average operation on waveforms of the push-pull signal DPP located within sixteen frames of the push-pull signal DPP, respectively, to generate a moving average waveform of a normal size corresponding to the sixteen frames according to the waveforms corresponding to the sixteen frames. And secondly, finding a maximum of the moving average waveform to generate the first maximum PEAK. That is, the first maximum PEAK is the maximum of the moving average waveform. According to the second embodiment, the first maximum detection unit 220 further includes: a moving average unit 222 coupled to the DVD drive for performing the moving average operation on the waveforms of the push-pull signal DPP to generate the moving average waveform; and a moving average waveform maximum detection unit 224 electrically connected to the moving average unit 222 and the DSP 230 for finding the maximum of the moving average waveform to generate the first maximum PEAK.

As mentioned above, the present invention method and device generate the first maximum PEAK for each unit of at least one frame. This is also an implementation choice and is not a limitation of the present invention. In another embodiment of the present invention, the local maximum detection unit 222 generates a first maximum PEAK of the push-pull signal DPP for each unit of a predetermined time period corresponding to a normal size of one frame and the moving average unit 224 performs a moving average operation on the first maximum PEAK generated within a predetermined time period corresponding to a normal size of sixteen frames.

What is claimed is:

1. A method for automatically tuning a pre-pit slicing level, the pre-pit slicing level being used for slicing a first signal generated by an optical storage device when reading an optical storage disc to identify at least one pre-pit signal within the first signal, the method comprising the following steps:
    finding a first maximum according to the first signal; and
    generating the pre-pit slicing level according to the first maximum so that the optical storage device is capable of identifying the pre-pit signal within the first signal.

2. The method of claim 1, wherein the first signal is a push-pull signal generated by the optical storage device when reading the optical storage disc.

3. The method of claim 2, wherein the finding step finds the first maximum according to a digital signal converted from the first signal using an analog-to-digital conversion.

4. The method of claim 1, wherein the finding step further comprises:
    finding an average maximum of the first signal at a plurality of first predetermined time periods by performing a moving average operation to generate the first maximum.

5. The method of claim 4, wherein the finding step firstly finds a plurality of maximums of the first signal located within the plurality of first predetermined time periods respectively, and secondly performs the moving average operation on the plurality of maximums to generate the average maximum.

6. The method of claim 4, wherein the finding step firstly performs the moving average operation on waveforms of the first signal located within the plurality of first predetermined time periods respectively to generate a moving average waveform, and secondly finds a maximum of the moving average waveform to generate the first maximum.

7. The method of claim 4, wherein a length of each first predetermined time period out of the plurality of first predetermined time periods corresponds to a length of at least one frame of the first signal.

8. The method of claim 1, further comprising:
    repeating the generating step according to a latest value of the first maximum after a second predetermined time period.

9. The method of claim 1, wherein the generating step multiplies the first maximum with a predetermined decay factor to generate the pre-pit slicing level.

10. The method of claim 1, wherein the generating step subtracts a predetermined decay value from the first maximum to generate the pre-pit slicing level.

11. A method for automatically tuning a pre-pit slicing level, the pre-pit slicing level being used for slicing a first signal generated by an optical storage device when reading an optical storage disc to identify at least one pre-pit signal within the first signal, the method comprising:
    utilizing a signal source to generate the pre-pit slicing level; and
    switching the pre-pit slicing level to another signal source to maintain the stability of the optical storage device when a system state of the optical storage device varies.

12. The method of claim 11, wherein variations of the system state include:
    a read area of the optical storage disc by the optical storage device being changed from a data area to a blank area;
    the read area of the optical storage disc by the optical storage device being changed from a blank area to a data area;
    the optical storage device starting to perform a burning operation on the optical storage disc; and
    the optical storage device stopping performing the burning operation on the optical storage disc.

13. A circuit for automatically tuning a pre-pit slicing level, the pre-pit slicing level being used for slicing a first signal generated by an optical storage device when reading an optical storage disc to identify at least one pre-pit signal within the first signal, the circuit comprising:
    a first maximum detection unit coupled to the optical storage device for finding a first maximum according to the first signal; and
    a control unit coupled to the first maximum detection unit for generating the pre-pit slicing level according to the first maximum so that the optical storage device is capable of identifying the pre-pit signal within the first signal.

14. The circuit of claim 13, wherein the first maximum detection unit further comprises:
    a local maximum detection unit coupled to the optical storage device for finding a plurality of maximums of the first signal located within a plurality of first predetermined time periods respectively; and
    a moving average unit electrically connected to the local maximum detection unit and the control unit for performing a moving average operation on the plurality of maximums to generate an average maximum being the first maximum.

15. The circuit of claim 13, wherein the first maximum detection unit further comprises:
   a moving average unit coupled to the optical storage device for performing a moving average operation on waveforms of the first signal located within a plurality of first predetermined time periods respectively to generate a moving average waveform; and
   a moving average waveform maximum detection unit electrically connected to the moving average unit and the control unit for finding a maximum of the moving average waveform to generate the first maximum.

16. The circuit of claim 13, wherein the first signal is a push-pull signal generated by the optical storage device when reading the optical storage disc.

17. The circuit of claim 16 further comprising:
   an analog-to-digital converter (ADC) coupled to the optical storage device and electrically connected to the first maximum detection unit for converting the first signal into a digital signal used for finding the first maximum by the first maximum detection unit.

18. The circuit of claim 13, wherein the control unit is a digital signal processor (DSP), and the control unit multiplies the first maximum with a predetermined decay factor or subtracts a predetermined decay value from the first maximum to generate the pre-pit slicing level.

19. The circuit of claim 13, wherein the control unit is a digital signal processor (DSP), and the control unit repeatedly generates the pre-pit slicing level according to a latest value of the first maximum after a second predetermined time period.

20. The circuit of claim 13, further comprising:
   a multiplexer coupled to the control unit for switching the pre-pit slicing level to another signal source to maintain the stability of the optical storage device when a system state of the optical storage device varies.

* * * * *